May 29, 1928.  
A. S. ANZELL  
MIRROR BRACKET FOR MOTOR CARS  
Filed Jan. 15, 1927
1,671,692
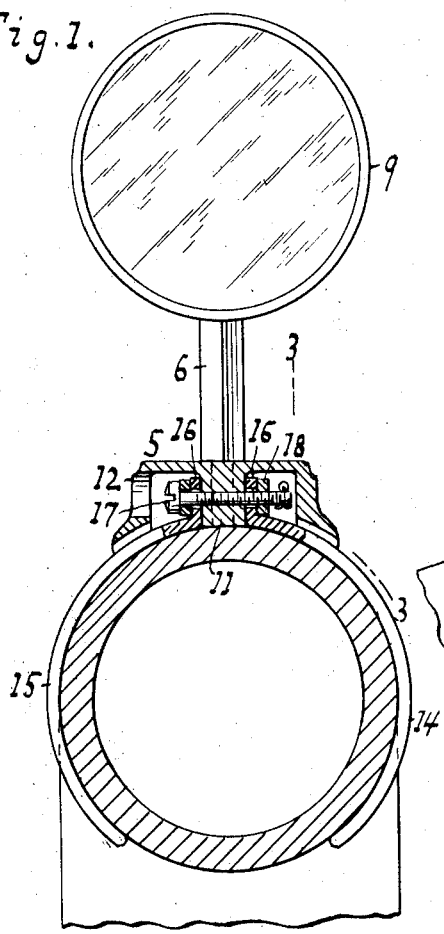
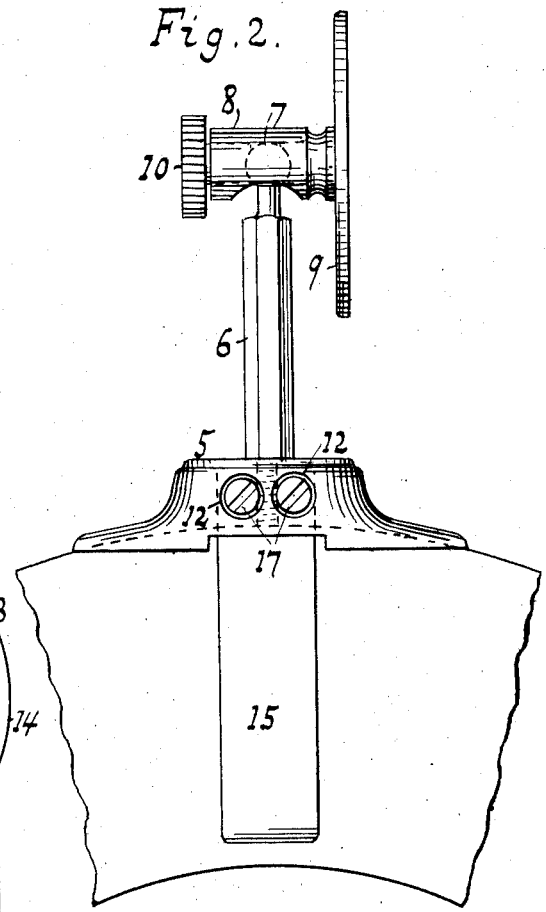
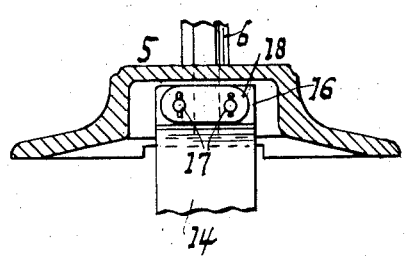
INVENTOR.  
Anna Sylvia Anzell  
BY *Hauff & Warland*  
ATTORNEYS.

Patented May 29, 1928.

1,671,692

UNITED STATES PATENT OFFICE.

ANNA SYLVIA ANZELL, OF FAR ROCKAWAY, NEW YORK.

MIRROR BRACKET FOR MOTOR CARS.

Application filed January 15, 1927. Serial No. 161,259.

This invention relates to a mirror fixture which is adapted to be fastened to a spare tire carried at the forward side portion of a motor car so that the operator can observe objects within a certain distance beyond the rear of the car.

The invention is designed to provide a pair of segmental bands to embrace the tire and means concealed in a hollow saddle or support for adjusting the bands in order to lock or release the miror fixture.

Heretofore, this type of mirror was attached to the tire by means of leather straps coacting with slots in a saddle but the objection to this mode of fastening is that the mirror could be easily stolen merely by cutting or unbuckling the straps.

It is the object of the present invention to construct a connection with the tire by means of rigid metal bands which are fastened in the saddle by invisible screws housed in the saddle.

The invention resides more particularly in the novel combinations hereinafter described and claimed, reference being made to the accompanying drawing in which:—

Fig. 1 represents a front elevation partly in section of a mirror fixture embodying this invention.

Fig. 2 is a side elevation of the same.

Fig. 3 is a vertical section taken along the line 3 3 of Fig. 1 the tire being omitted.

In the drawing the numeral 5 designates a saddle having an angular stem 6 fixed thereto and projecting upwardly. The upper end of the stem is provided with a ball 7 made to engage sockets formed in a sleeve 8 secured to the metal back 9 of a mirror. A screw 10 when tightened jams the ball into the socket thereby fixing the mirror but when the screw is loosened the mirror can be positioned at any angle relative to the angular stem.

The saddle is hollow and it has a transverse web 11 extending downwardly to divide it into two compartments. The inner side portion of the saddle is provided with a pair of holes 12 leading into one of the compartments and it has feet to support it on a tire as indicated in Figs. 1 and 2. In order to fasten the saddle to the tire a pair of segmental bands 14 and 15 respectively shaped to embrace the tire are employed. The upper portions of these bands extend into the compartments in the saddle and the end portion 16 of each band is turned upward with a hole for mounting it. The bands are adjusted by means of a pair of screws 17 each passing through its respective hole in the upwardly turned end of one of the bands and threaded into the web of the saddle. The screws when tightened by the insertion of a screw driver into the hole 12 to engage the grooved head of a screw jam the segmental bands against the periphery of the tire. The ends of the screws coacting with the segment 14 are engaged by a yoke 18 which when the screws are tightened forces the upwardly turned end of the segment against the web.

When it is desired to release the fixture from the tire the screws are loosened thus permitting both bands to move along the screw away from the web and the circumference of the tire. As shown in Fig. 1, the holes 12 are situated on the inner side of the saddle and it will be obvious that they cannot be seen by a person looking toward the outer side of the tire. In this arrangement it will be impossible for a person outside of the car to tamper with the screws while the tire remains locked to the running board or body of the car.

I claim:—

1. A mirror bracket for motor cars comprising a hollow saddle provided with a web, a screw threaded in the web located in the hollow portion of the saddle accessible from the exterior thereof when the saddle is positioned on a tire, and a pair of segmental bands mounted on the screw made to snugly embrace the tire by adjusting the screw.

2. A mirror bracket for motor cars comprising a hollow saddle made to be supported on a tire provided with a hole on its inner side, segmental bands mounted in the hollow part of the saddle made to engage the tire, and a screw accessible through the hole for adjusting the bands to secure or remove the fixture from the tire.

3. A mirror bracket for motor cars comprising a saddle having a web to divide it into two compartments and a hole on its inner side leading to a compartment, a pair of segmental bands mounted in the compartments, each of said bands having an angular end with a hole, and a screw extending through the holes engaging the web accessible through the side hole for fastening or removing the bands.

In testimony whereof I have hereunto set my hand.

ANNA SYLVIA ANZELL.